US010718218B2

(12) United States Patent
Dierksmeier

(10) Patent No.: US 10,718,218 B2
(45) Date of Patent: Jul. 21, 2020

(54) TURBINE BLISK WITH AIRFOIL AND RIM COOLING

(71) Applicant: Rolls-Royce North American Technologies Inc., Indianapolis, IN (US)

(72) Inventor: Douglas D. Dierksmeier, Franklin, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 71 days.

(21) Appl. No.: 15/911,367

(22) Filed: Mar. 5, 2018

(65) Prior Publication Data

US 2019/0271231 A1 Sep. 5, 2019

(51) Int. Cl.
*F01D 5/18* (2006.01)
*F01D 5/34* (2006.01)
*F01D 5/28* (2006.01)

(52) U.S. Cl.
CPC .............. *F01D 5/187* (2013.01); *F01D 5/28* (2013.01); *F01D 5/34* (2013.01); *F05D 2220/32* (2013.01); *F05D 2230/10* (2013.01); *F05D 2230/21* (2013.01); *F05D 2240/24* (2013.01); *F05D 2260/20* (2013.01); *F05D 2300/175* (2013.01)

(58) Field of Classification Search
CPC ............. F01D 5/187; F01D 5/34; F01D 5/188
See application file for complete search history.

(56) References Cited

U.S. PATENT DOCUMENTS

| 3,446,481 | A | * | 5/1969 | Kydd | F01D 5/08 |
| | | | | | 416/92 |
| 5,244,345 | A | | 9/1993 | Curtis | |
| 5,876,182 | A | | 3/1999 | Schulte | |
| 6,022,190 | A | | 2/2000 | Schillinger | |
| 6,213,714 | B1 | | 4/2001 | Rhodes | |
| 6,485,262 | B1 | * | 11/2002 | Heyward | C23C 10/06 |
| | | | | | 416/241 R |
| 7,431,564 | B2 | | 10/2008 | Newman | |
| 7,442,008 | B2 | * | 10/2008 | Kopmels | F01D 5/18 |
| | | | | | 416/191 |
| 8,556,576 | B2 | | 10/2013 | Wilson, Jr. et al. | |

(Continued)

FOREIGN PATENT DOCUMENTS

| DE | 10361882 A1 | 7/2005 |
| WO | WO 2011/054342 A1 | 5/2011 |

OTHER PUBLICATIONS

Schreiber, English translation of DE 10361882 A1 (Year: 2005).*

*Primary Examiner* — Woody A Lee, Jr.
*Assistant Examiner* — Michael L Sehn
(74) *Attorney, Agent, or Firm* — Brinks Gilson & Lione

(57) ABSTRACT

A blisk for a turbine engine is provided, the blisk includes a hub, a rim positioned radially outward from the hub, and a blade. The rim an outer surface facing radially outward from the hub and an inner surface. The blade is integral to the rim and includes a leading end, a trailing end, an interior surface, and a radially inward end. A cooling passage extends from an inlet in the inner surface of the rim, from the inlet through a channel enclosed within the rim and extending along the outer surface of the rim, and from the channel through an opening at the trailing end of the blade into a chamber defined by the interior surface of the blade.

20 Claims, 5 Drawing Sheets

(56) References Cited

U.S. PATENT DOCUMENTS

| | | |
|---|---|---|
| 8,992,168 B2 | 3/2015 | Norris et al. |
| 2006/0093484 A1 | 5/2006 | Liang |
| 2007/0071608 A1 | 3/2007 | Trewiler et al. |
| 2010/0284817 A1 | 11/2010 | Bamberg et al. |
| 2010/0322767 A1 | 12/2010 | Nadvit et al. |
| 2011/0255991 A1 | 10/2011 | Borufka et al. |
| 2013/0039760 A1 | 2/2013 | Burt et al. |
| 2016/0130957 A1 | 5/2016 | Freeman et al. |
| 2016/0222806 A1 | 8/2016 | Jennings |
| 2016/0222822 A1 | 8/2016 | Jennings |
| 2016/0258320 A1 | 9/2016 | Thomas et al. |

\* cited by examiner

TURBINE BLISK WITH AIRFOIL AND RIM COOLING

TECHNICAL FIELD

This disclosure relates to rotors for gas turbine engines, and, in particular to blisks for a turbine section of a rotor.

BACKGROUND

Turbine sections of low cost and limited use gas turbine engines typically include rotors having blisks, which include a combined hub, rim, and turbine blades. Typically, a blisk is made of a variety of materials, and the portions of the blisk exposed to high thermal operational stresses are made from a highly thermally resistant material, such as a ceramic matrix composite.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Typically, turbine inlet temperatures in gas turbine engines are as high as possible to maximize efficiency of the turbine section. Manufacturing blisks within the turbine section, or portions of blisks, from a highly thermal resistant material, such as a ceramic matrix composite, may not be cost effective. Furthermore, blisks manufactured from multiple materials are more complicated to assemble and more likely to fail due to differential thermal expansion caused by operational thermal stress. It is desirable that blisks within the turbine section be less expensive, require fewer parts, and allow operation of the turbine section with the highest possible turbine inlet temperature.

The following description is merely exemplary in nature and is not intended to limit the present disclosure, application, or uses.

By way of an introductory example, a blisk for use in a turbine section of a gas turbine engine is provided, the blisk including a hub, a rim, and a blade. The rim is positioned radially outward from the hub. The rim includes a first end, a second end, an outer surface facing radially outward from the hub and extending from the first end to the second end, and an inner surface. The blade is integral to the rim and includes a leading end, a trailing end, an interior surface, and a radially inward end. A cooling passage extends from an inlet defined in the inner surface of the rim, from the inlet through a channel enclosed within the rim and extending along the outer surface of the rim, and from the channel through an opening at the trailing end of the blade into a chamber defined by the interior surface of the blade.

One interesting feature of the systems and methods described below may be that the blisks may be cheaper to produce than a similar blisks comprising two or more different materials. Alternatively, or in addition, an interesting feature of the systems and methods described below may be that cooling air provided through the cooling passage may allow the turbine inlet temperature for the turbine section to be higher than some other single-forged blisks without cooling passages, improving the efficiency of the turbine section.

Figure 1:
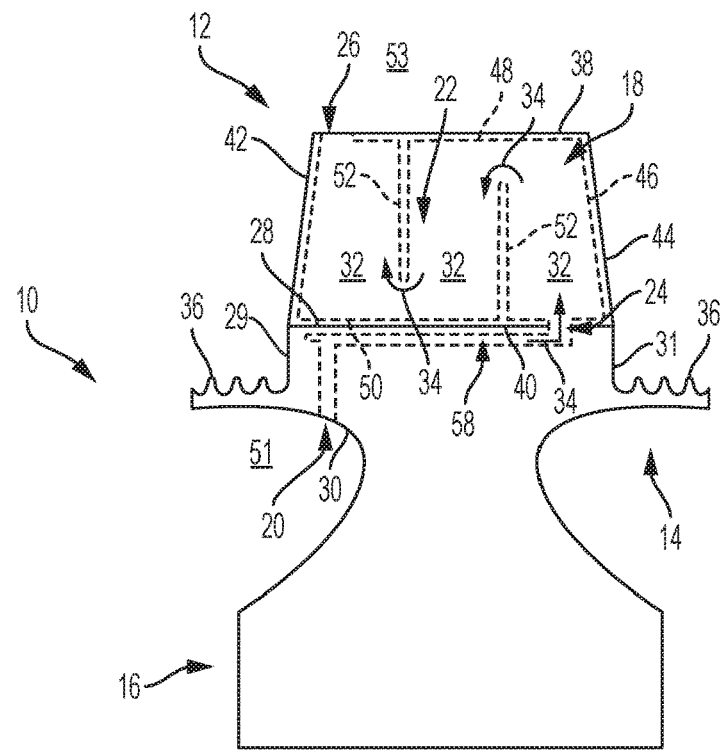
FIG. 1 illustrates a partial cross-sectional side view of a first example of a blisk.

FIG. 1. Illustrates a partial cross-sectional side view of a blisk 10 including a hub 16, a rim 14, and a blade 12. The blisk 10 may be any component which couples to the rotor (99 in FIG. 5) and is configured to receive and rotate a set of the turbine blades 12. Examples of the blisk 10 may include a cone, a cylinder, or any shape having radial symmetry about the centerline (X in FIG. 5) of the rotor 99. The blisk 10 may be made from any material capable of withstanding the radial forces and thermal stresses of operating in the turbine section (95 in FIG. 5), such as titanium, stainless steel, or a nickel-based superalloy. All components of the blisk 10, including the hub 16, the rim 14, and the blades 12 may be made from a single forging and machining process.

For the purposes of this application, the term "radially outward" may describe the position of an element with respect to its distance away from the centerline X of the rotor 99 or the center of the hub 16. The term "radially inward" may describe the position of an element with respect to its distance toward the centerline X of the rotor 99 or the center of the hub 16. The term "leading" may describe the position of an element facing the upstream direction with respect to the flow (D1 in FIG. 5) of air within the turbine section (95 in FIG. 5). The term "trailing" may describe the position of an element facing the downstream direction with respect to the flow D1 of air within the turbine section 95.

The hub 16 may be the most radially inward portion of the blisk 10 (relative to the rotor 99) and may be any portion of the blisk 10 configured to be coupled to the rotor 99. Examples of the hub 16 may include a cone, a cylinder, or any other radially symmetric shape. The hub 16 may be made from the same materials as any other portion of the blisk 10. The rotor 99 may pass through the blisk 10 and be coupled to the hub 16.

The rim 14 may be any portion of the blisk 10 which extends radially outward from the hub 16. Examples of the rim 14 may include a cone, a cylinder, a ring, or any other radially symmetric shape. The rim 14 may be made from the same materials as any other portion of the blisk 10. The rim 14 may include an outer surface 28 at the radially outward end of the rim 14 which extends from a leading end 29 of the rim 14 to a trailing end 31 of the rim 14. The blades 12 may project radially outward from the outer surface 28. The rim 14 may further include an inner surface 30 which is offset from the outer surface 28. The inner surface 30 of the rim 14 may be any surface which extends radially outward from the hub 16. The inner surface 30 may be opposed to the outer surface 28, perpendicular to the outer surface 28 or angularly offset from the outer surface 28 at an acute or obtuse angle. The rim 14 may also include vane seals 36 at the leading end 29 and the trailing end 31 of the rim 14. The vane seals 36 may be any component which is configured to extend between stages of blisks 10 within the turbine section 95 and contact a vane (91 in FIG. 5) as the blisk 10 rotates during operation. Examples of the vane seals 36 may include corrugated surfaces, flat surfaces, or curved surfaces. The leading end 29 of the rim 14 may face the upstream direction with respect to the flow D1 of air within the turbine section 95. The trailing end 31 of the rim 14 may face the downstream direction with respect to the flow D1 of air within the turbine section 95.

The blades 12 may be any portion of the blisk 10 which extends radially outward from the outer surface 28 of the rim 14. Examples of the blades 12 may include an airfoil, a curved surface, or a curved object which varies in thickness along its length. Each blade 12 may extend from a leading end 42 to a trailing end 44. The leading end 42 of the blade 12 may be proximate to the leading end 29 of the rim 14. The trailing end 44 of the blade 12 may be proximate to the trailing end 31 of the rim 14. Each blade 12 may be integrally formed on the outer surface 28 of the rim 14 at a radially inward end 40. The blade 12 may extend radially outward from the radially inward end 40 to a radially outward surface 38 of the blade 12.

The blade 12 and rim 14 may define a cooling passage 18. The cooling passage 18 may be any passage extending through the rim 14 and the blade 12 which is adapted to deliver cooling fluid to the outer surface 28 of the rim 14 and the blade 12. The inner surface 30 of the rim 14 may define an inlet 20 of the cooling passage 18. The inlet 20 may extend along the outer surface 28 of the rim 14 through a channel 58 from the leading end 29 of the rim 14 to the trailing end 31 of the rim 14. The channel 58 may be enclosed within the rim 14. The channel 58 may extend along the outer surface 28 between 0.025 inches and 0.040 inches beneath the outer surface 28 to provide effective cooling to the outer surface 28. The channel 58 may extend from between 0.025 inches and 0.040 inches from the leading end 29 of the rim 14 to between 0.025 inches and 0.040 inches from the trailing end 31 of the rim 14. The radially inward end 40 of the blade 12 may define an opening 24 proximate to the trailing end 44 of the blade 12 which is in fluid communication with the channel 58. The blade 12 may also include an interior surface 46 which defines a chamber 22 within the blade 12. The chamber 22 may be in fluid communication with the channel 58 through the opening 24 in the radially inward end 40 of the blade 12. The radially outward surface 38 of the blade 12 may define an outlet 26 of the cooling passage 18 proximate to the leading end 42 of the blade 12. The outlet 26 may be in fluid communication with the chamber 22.

The cooling passage 18 is adapted such that a path of flow 34 for cooling fluid passing through the cooling passage 18 is supplied from a cooling source 51, enters the cooling passage 18 through the inlet 20, passes through the channel 58, enters the chamber 22 through the opening 24 in the radially inward end 40 of the blade 12, through the outlet 26, and into a vent 53. The cooling source 51 may be any source of cooling fluid supplied to the blisk 10. For example, the cooling source 51 may be air from an intake section (96 in FIG. 5) of the turbine engine (92 in FIG. 5) or bleed air in the compressor section (93 in FIG. 5) of the turbine engine 92. The vent 53 may be any path for cooling fluid to be removed from the blisk 10. For example, the vent 53 may be an exhaust section (97 in FIG. 5) of the turbine engine 92 or the chamber of the turbine section 95.

The cooling fluid may enter the channel 58 at the leading end 29 of the rim 14 where the thermal stress on the rim is greatest. Similarly, the cooling fluid may enter the chamber 22 at the trailing end 44 of the blade 12 where the thermal stress on the blade 12 is greatest. In other embodiments, other configurations may be desirable to prioritize the flow of cooling fluid towards areas under greater thermal stress.

In some embodiments, the interior surface 46 may include a wall 52 extending into the chamber 22 from a radially inward end 50 or a radially outward end 48 of the interior surface 46. For example, as illustrated in FIG. 1, the interior surface 46 may include a first wall 52 extending radially outward from the radially inward end 50 of the interior surface 46. The interior surface 46 may also include a second wall 52 extending radially inward from the radially outward end 48 of the interior surface 46. The walls 52 may be adapted to direct the flow 34 of cooling fluid passing through the chamber 22, ensuring that every part of the blade 12 is cooled by the cooling fluid. As illustrated in FIG. 1, the walls 52 may direct the flow 34 of cooling fluid along a first pass 32 from the opening 24 to the radially outward end 48 of the interior surface 46 proximate to the trailing end 44 of the blade, then along a second pass 32 from the radially outward end 48 to the radially inward end 50, then along a third pass 32 from the radially inward end 50 to the outlet 26 proximate to the leading end 42 of the blade 12. Such a configuration may spread cooling fluid through the entire chamber 22 and prioritize the flow 34 of cooling fluid to areas of the blade 12 under greater thermal stress. In some embodiments, cooling fluid flow 34 through the chamber 22 may make up to five passes between the radially inward end 50 and the radially outward end 48 of the interior surface 46 to reach the outlet 26.

Figure 2:
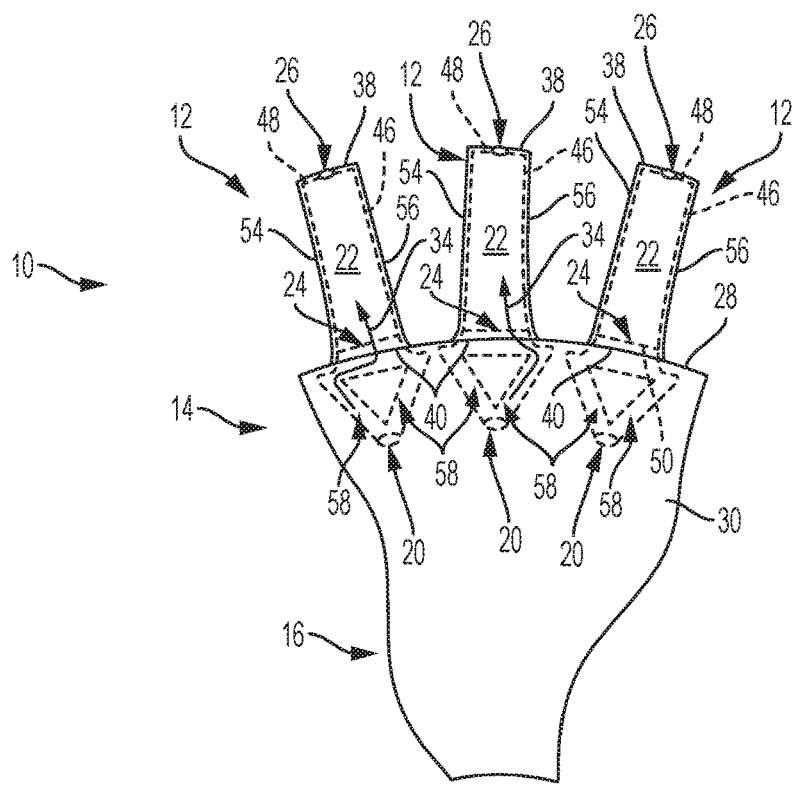
FIG. 2 illustrates a partial cross-sectional front view of a second example of the blisk.

FIG. 2 illustrates a partial cross-sectional front view of an example of the blisk 10. The blisk 10 may comprise a plurality of blades 12 space apart from each other on the outer surface 28 of the rim 14. Each of the blades 12 may have a pressure side 54 facing the direction of rotation of the blisk 10, and a suction side 56 opposing the direction of rotation of the blisk 10.

In some embodiments, the inlet 20 of each cooling passage 18 may divide into a first channel 58 extending downstream along a portion of the outer surface 28 of the rim 14 which is proximate to the pressure side 54 of the blade 12 and a second channel 58 extending downstream along a portion of the outer surface 28 of the rim 14 which is proximate to the suction side 56 of the blade 12. In such an embodiment, each first channel 58 of one of the cooling passages 18 is adjacent to a second channel 58 of another of the cooling passages 18. At the trailing end 31 of the rim 14, the first and second channels 58 turn and extend circumferentially along the outer surface 28 toward the blade 12 to reach the opening 24 into the chamber 22. Such a configuration may provide even cooling to the portions of the outer surface 28 of the rim 14 between the blades 12.

Figure 3:
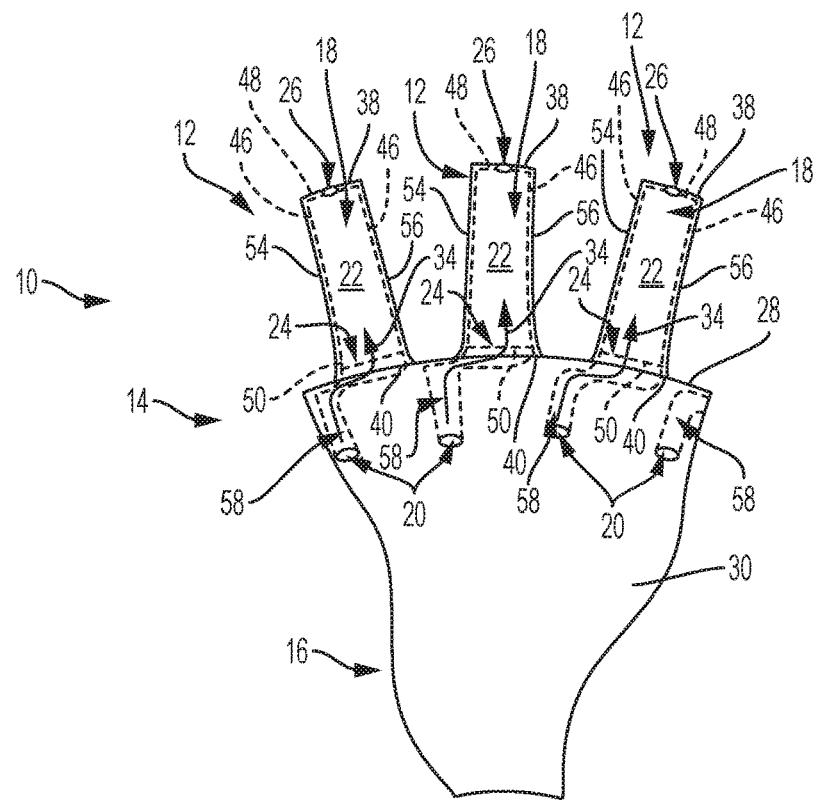
FIG. 3 illustrates a partial cross-sectional front view of a third example of the blisk.

An alternative embodiment is illustrated in FIG. 3. In some embodiments, each inlet 20 may include only one channel 58 extending along a portion of the outer surface 28 of the rim 14 between the blades 12. For example, a first cooling passage 18 associated with a first blade 12 may cool a portion of the outer surface 28 on the suction side 56 of the first blade 12. A second cooling passage 18 associated with a second blade 12 may cool the pressure side 54 of the first blade 12. Such a pattern may extend about the entire circumference of the blisk 10, providing cooling for every portion of the outer surface 28 between blades 12. Each channel 58 be turn at the trailing end 31 of the rim 14 and extending circumferentially toward their respective blade 12 to be in fluid communication with the opening 24 into the chamber 22. Such a configuration may be less costly and more simple to manufacture.

Figure 4:
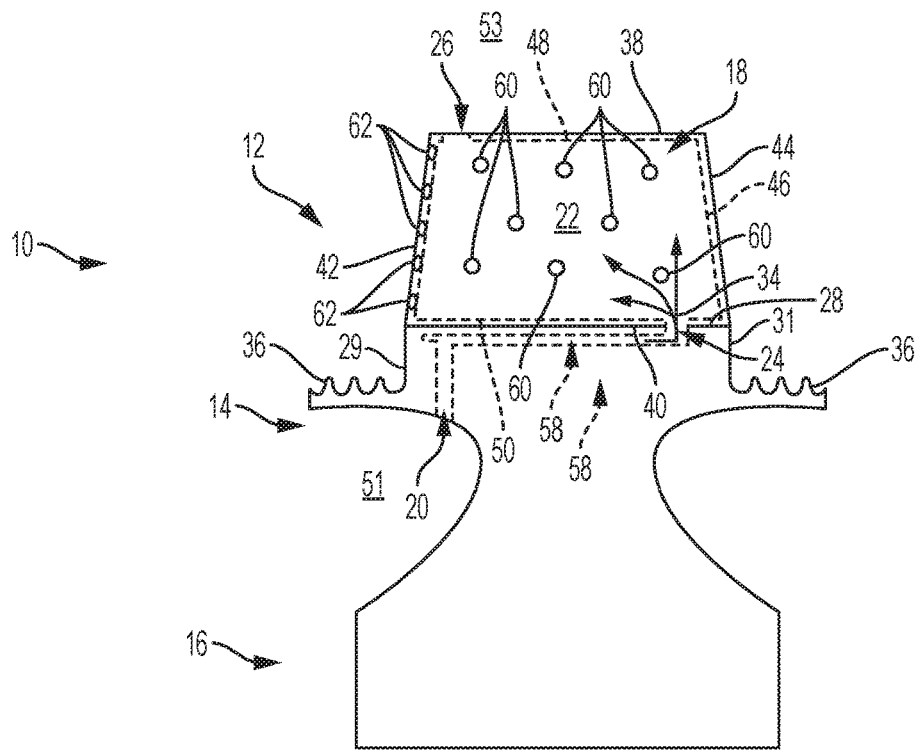
FIG. 4 illustrates a partial cross-sectional side view of a fourth example of the blisk.

FIG. 4 illustrates a cross-sectional side view of an alternative embodiment of the chamber 22. In some embodiments, the chamber 22 is configured to allow unobstructed flow of cooling fluid from the trailing end 44 to the leading end 42 of the blade 12. In such a configuration, cooling fluid may diffuse throughout the chamber 22 as it passes from the opening 24 in the radially inward end 40 of the blade 12 to the outlet 26.

As shown in FIG. 4, in such embodiments the chamber 22 may include struts 60 extending through the chamber 22 from a pressure side 54 of the blade 12 to the suction side 56 of the blade 12. The struts 60 may be any object which rigidly extends across chamber 22 of the blade 12. Examples of the struts 60 may include pylons, cylinders, or columns. The struts 60 may be formed of the same material as any other component of the blisk 10. The struts 60 may be arranged within the chamber 22 to promote flow 34 of the cooling fluid to more remote areas of the chamber 22. Additionally, the struts 60 may be arranged to provide structural support or the blade 12 and to prevent the pressure side 54 and suction side 56 of the blade from deforming under operating conditions.

The chamber 22 may also include bleed holes 62 on or near the leading end 42 of the blade 12. The bleed holes 62 may be any opening which allows fluid communication of the cooling fluid from the chamber 22 to the turbine section 95. Examples of bleed holes 62 may include openings, perforations, or slots. The bleed holes 62 may be arranged to promote even fluid flow 34 of the cooling fluid from the trailing end 44 of the blade 12 toward the leading end 42 of the blade 12. The bleed holes 62 may also assist in externally cooling the blade 12 using a portion of the cooling fluid within the chamber 22.

Figure 5:
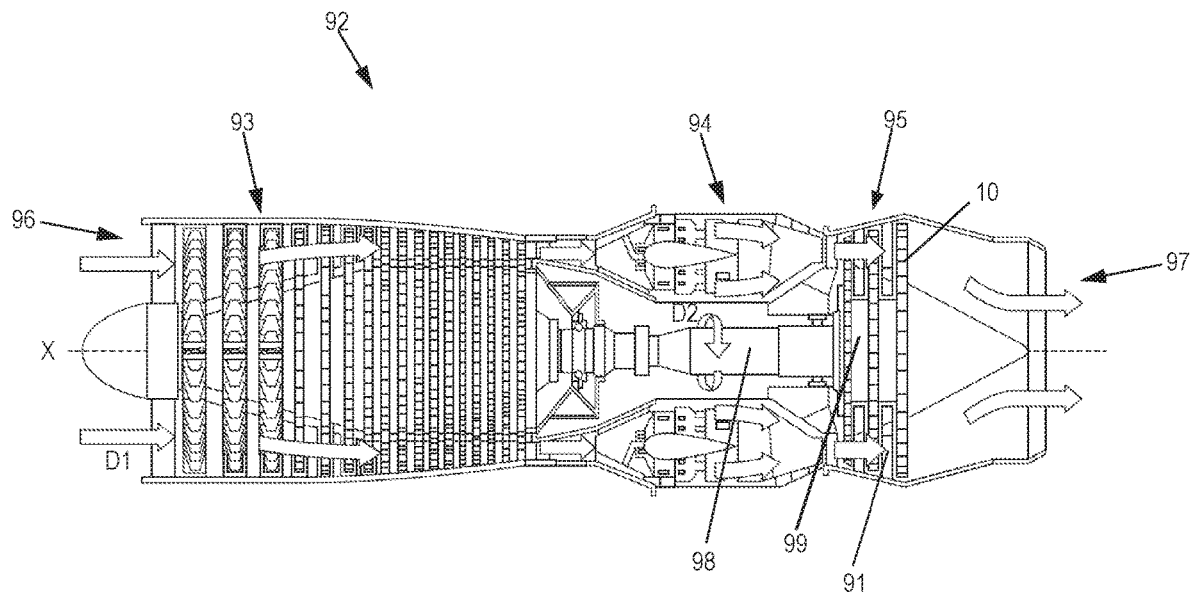
FIG. 5 illustrates a cross-sectional view of an example of a gas turbine engine.

FIG. 5 is a cross-sectional view of the gas turbine engine 92 for propulsion of, for example, an aircraft. Alternatively or in addition, the gas turbine engine 92 may be used to drive a propeller in aquatic applications, or to drive a generator in energy applications. The gas turbine engine 92 may include the intake section 96, the compressor section 93, a combustion section 94, the turbine section 95, and the exhaust section 97. During operation of the gas turbine engine 92, fluid received from the intake section 96, such as air, travels along the direction D1 and may be compressed within the compressor section 93. The compressed fluid may then be mixed with fuel and the mixture may be burned in the combustion section 94. The combustion section 94 may include any suitable fuel injection and combustion mechanisms. The hot, high pressure fluid may then pass through the turbine section 95 to extract energy from the fluid and cause a rotor 99 within the turbine section 95 to rotate, which in turn drives the a shaft 98 which drives the compressor section 93. Discharge fluid may exit the exhaust section 97.

As noted above, the hot, high pressure fluid passes through the turbine section 95 during operation of the gas turbine engine 92. As the fluid flows through the turbine section 95, the fluid passes between alternating turbine blades 12 and vanes 91 causing the rotor 99 to rotate. The rotor 99 may turn a shaft 98 in a rotational direction D2, for example. The turbine blades 12 may rotate around an axis of rotation, which may correspond to a centerline X of the rotor 99 in some examples. The centerline X may be a longitudinal axis which extends across the entire length of the rotor 99, along the axis of rotation. The vanes 91 may remain stationary relative to the turbine blades 12 while the rotor 99 is rotating.

Figure 6:
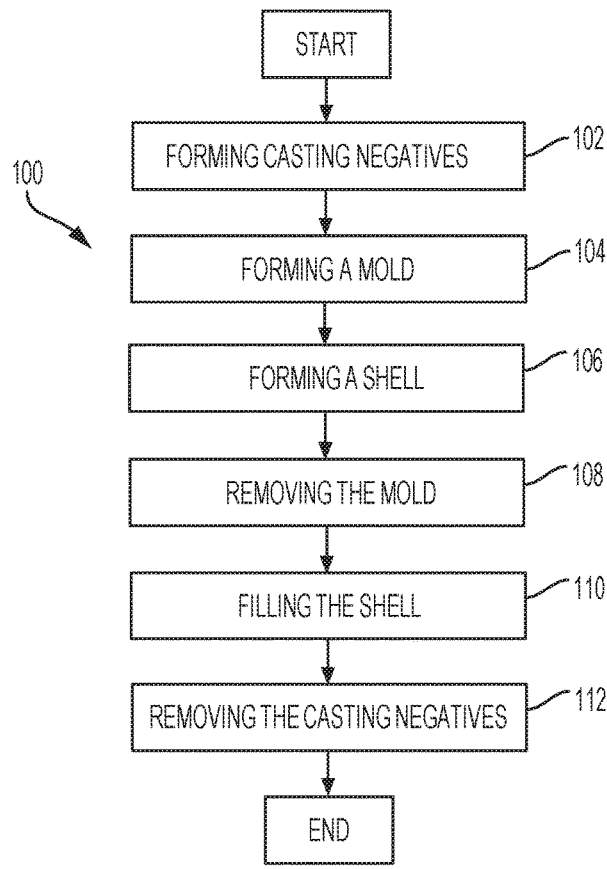
FIG. 6 illustrates a flow diagram of an example of a method of manufacturing a blisk.

FIG. 6 illustrates a flow diagram of an example of a method of manufacturing the blisk 10 for use in the gas turbine engine 92 (100). The steps may include additional, different, or fewer operations than illustrated in FIG. 6. The steps may be executed in a different order than illustrated in FIG. 6.

Figure 7:
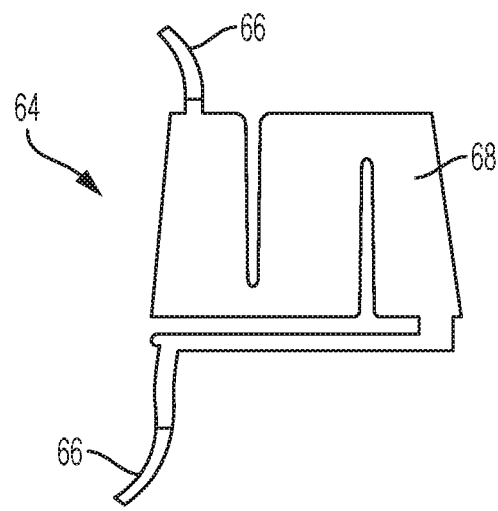
FIG. 7 illustrates a side plan view of an example of a casting negative for a cooling passage.

A plurality of casting negatives 64 are formed (102) from a first material. As illustrated in FIG. 7, the casting negatives 64 may be any component which takes the shape of the cooling passage 18 of the finished blisk 10. The first material of the casting negatives 64 may be any material which is sufficiently rigid to hold its shape under the high thermal stresses of thermal casting. Examples of the first material may be silica or alumina. In some embodiments, the first material may be dissolvable. Each of the casting negatives 64 may include an outer surface 68. The outer surface 68 of each casting negative 64 may define the shape of the inlet 20, the channel 58, the chamber 22, and the outlet 26 of the cooling passage 18 within the finished blisk 10.

The casting negatives 64 may also include printouts 66 which project away from where the inlet 20 and the outlet 26 of the cooling passage 18 would be in the finished blisk 10. The printouts 66 may be any structure which is rigid enough to support the position of the casting negative 64. Examples of the printouts 66 may be tails, pylons, or ribbons. The printouts 66 may be made from the same material as the casting negatives 64 and may be integrally formed with the casting negatives 64. The printouts 66 may be shaped to avoid interference with the formation of the blisk 10. Therefore, the printouts 66 may extend away from what will be the finished blisk 10.

After forming the casting negatives 64, a mold 70, 72 is formed of the finished blisk 10 (104). In some embodiments, the mold 70, 72 includes a hub mold 72 and a plurality of blade/rim molds 70. The hub mold 72 may be any mold which accurately represents the shape of the hub 16 of the blisk 10. The hub mold 72 may be made of a second material which has a melting temperature lower than a melting temperature of the first material. An example of the second material may include wax. The blade/rim molds 70 may be any mold which encloses the casting negative 64 of the cooling passage 18, and which accurately represents the shapes of a portion of the rim 14 and the blade 12. The blade/rim molds 70 may be made of the same material as the hub mold 72.

Figure 8:
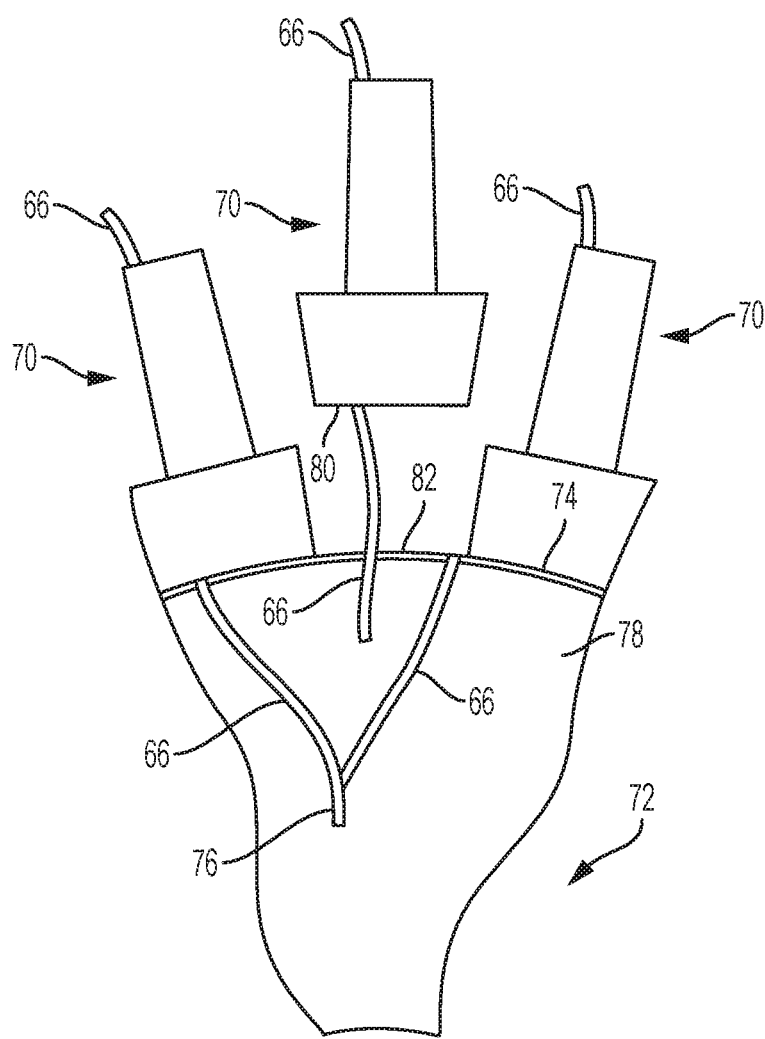
FIG. 8 illustrates partial front view of an example of mold of a blisk.

As illustrated in FIG. 8, the blade/rim molds 70 may have a radially inward surface 80 which may be joined a radially outward surface 82 of the hub mold 72. The blade/rim molds 70 and the hub mold 72 may be joined together along a seam 74 using techniques such as wax-welding. The seam 74 may bulge away from the side 78 of the hub mold 72. The blade/rim molds 70 may be joined to one another using similar techniques. The printouts 66 may be adapted to extend through and away from the blade/rim molds 70. When the blade/rim molds 70 are joined to the hub mold 72, the printouts 66 may be joined together at printout joints 76. Printout joints 76 may be created by a variety of techniques such as weaving, twisting, braiding, or fusing.

Figure 9:
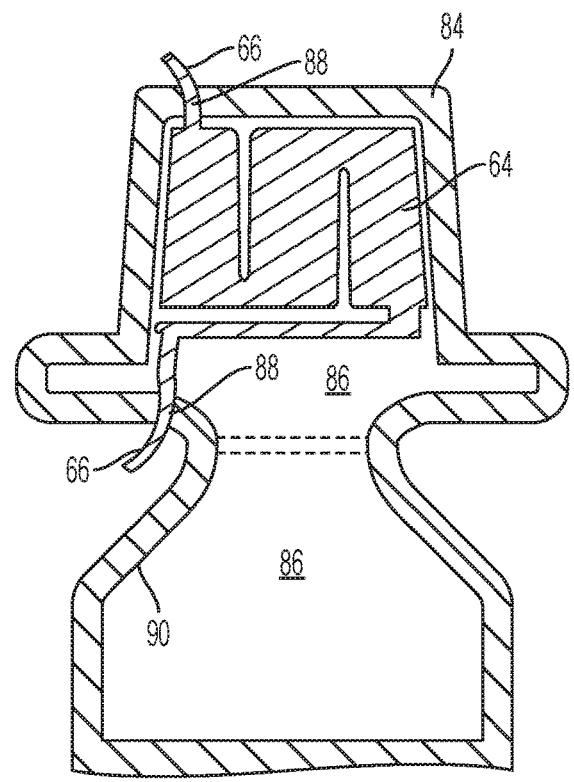
FIG. 9 illustrates a partial cross-sectional view of an example of the casting negative and a shell.
Figure 10:
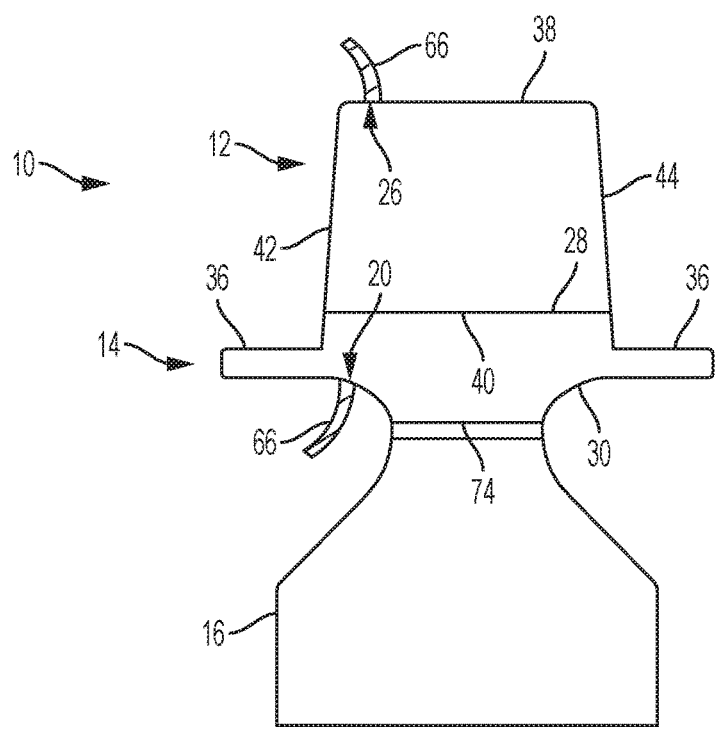
FIG. 10 illustrates a side plan view of an example of an unfinished blisk.

After forming the mold 70, 72 of the blisk 10, a shell 84 may be formed around the mold 70, 72 (106). The shell 84 may be any material which encloses the mold 70, 72 and which retains its shaped with the presence of the mold 70, 72. The mold may be made a third material. The third material may be any material which has a melting temperature which is higher than the melting temperature of the second material of the mold 70, 72. In some embodiments, the third material may be the same as the first material. As illustrated in FIG. 9, the printouts 66 may extend through the shell 84 or may be embedded into the shell 84 to form joints 88 between the shell 84 and the printouts 66. The joints 88 may fix the relative position of the casting negatives 64 with respect to the shell 84.

After the shell 84 has been formed, the mold 70, 72 may be removed from the shell 84 (108). The mold 70, 72 may be removed in a variety of techniques. For example, where the mold 70, 72 is made of wax, the mold 70, 72 may be removed by heating the mold 70, 72 to a temperature higher than the melting point of the second material but lower than the melting points of the first material and the second material. After the mold 70, 72 has been removed, the shell defines a cavity 86 in the shape of the finished blisk 10, as shown in FIG. 9. The position of the casting negatives 64 is fixed by the joints 88 between the printouts 66 and the shell 84.

After the mold 70, 72 has been removed, the shell 84 may be filled with a fourth material to form the blisk 10 (110). The fourth material may be any material suitable for the blisk 10 as described above. The fourth material may have a melting temperature which is lower than a melting temperature of the first material and the third material. Once the blisk 10 has been formed the shell 84 may be removed by techniques such as cracking or dissolving.

After the shell 84 has been filled and the blisk 10 has been formed, the casting negatives 64 may be removed (112). In some embodiments, the casting negatives 64 may be removed by dissolving the first material in an acid bath, where the fourth material of the blisk 10 is resilient to the acid.

After the shell 84 has been removed, the method (100) may further include machining the blisk 10 to finish surface details, such as removing the bulges created by the seams 74 between the hub mold 72 and the blade/rim molds 70, and forming grooves in the vane seals 36.

Each component may include additional, different, or fewer components. For example, the vane seals 36 may not be included in some embodiments of the blisk 10. Additionally, in some embodiments, cooling passage 18 may not include a channel 58 along the outer surface 28 of the rim 14. Instead, direct cooling may be applied to the outer surface 28 and the inlet 20 of the cooling passage may extend directly to the chamber 22.

The method (100) may be implemented with additional, different, or fewer components. For example, in some embodiments of the method (100) the step of forming the mold 70, 72 (108) may be omitted. This may be particularly relevant in embodiments wherein the shape of the shell 84 is pre-made without the mold 70, 72.

The logic illustrated in the flow diagrams may include additional, different, or fewer operations than illustrated. The operations illustrated may be performed in an order different than illustrated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A blisk for use in a turbine section of a gas turbine engine, the blisk comprising:
   a hub;
   a rim positioned radially outward from the hub, wherein the rim comprises an outer surface facing radially outward from the hub, and an inner surface; and
   a blade integral to the rim, the blade comprising a leading end, a trailing end, an interior surface within the blade, a radially inward end, wherein a cooling passage extends from an inlet defined in the inner surface of the rim, from the inlet through a channel enclosed within the rim and extending along the outer surface of the rim, and from the channel through an opening at the trailing end of the blade into a chamber defined by the interior surface of the blade.

2. The blisk of aspect 1, comprising a plurality of blades and a plurality of cooling passages, wherein each blade is spaced apart from each other on the outer surface of the rim, and wherein each channel extends along a portion of the outer surface of the rim which is arranged between a pair of the plurality of blades.

3. The blisk of aspect 2, wherein each cooling passage comprises a first channel extending along a portion of the outer surface which is proximate to a pressure side of the blade, and a second channel extending along a portion of the outer surface which is proximate to a suction side of the blade.

4. The blisk of aspect 3, comprising a plurality of blades and a plurality of cooling passages, wherein each blade is spaced apart from each other on the outer surface of the rim, and wherein each first channel of one of the cooling passages is adjacent to the second channel of another of the cooling passages.

5. The blisk of any of the above aspects, wherein the blisk is a unitary body formed from a single casting.

6. The blisk of aspect 5, wherein the blisk comprises a nickel-based superalloy.

7. A turbine section for use in a gas turbine engine, comprising:
   a blisk comprising a hub and a rim positioned radially outward from the hub, wherein the rim comprises a first end, a second end, an outer surface extending from the first end to the second end, and an inner surface, and a blade integral to the rim, the blade comprising a leading end proximate to the first end of the rim, a trailing end proximate to the second end of the rim, an interior surface defining a chamber, a radially inward end, and a radially outward surface opposed to the radially inward end;
   wherein a cooling passage extends from an inlet defined by the inner surface at the first end of the rim, from the inlet through an opening into the chamber of the blade which is proximate to the trailing end of the blade, and from the chamber through an outlet in the radially outward surface at the leading end of the blade;

a cooling source configured to supply fluid to the inlet of the cooling passage; and a vent configured to receive fluid from the outlet of the cooling passage.

8. The turbine section of aspect 7, wherein the chamber of the cooling passage is configured to allow unobstructed flow of fluid from the trailing end to the leading end of the blade.

9. The turbine section of aspect 8, wherein the interior surface of the cooling passage comprises a strut extending through the chamber from a pressure side of the blade to a suction side of the blade.

10. The turbine section of any of aspects 8 and 9, wherein the interior surface of the blade defines an opening at the leading end of the blade, wherein the opening is configured to allow fluid communication between the chamber and an exterior surface of the blade.

11. The turbine section of aspect 7, wherein the interior surface of the blade comprises a first wall extending radially outward from a radially inward end of the interior surface and a second wall extending radially inward from a radially outward end of the interior surface.

12. The turbine section of aspect 11, wherein the second wall is positioned closer to the outlet of the cooling passage than the first wall, such that fluid passing through the chamber must make three passes between the radially inward end and the radially outward end of the interior surface between the opening of the chamber and the outlet of the cooling passage.

13. A method of manufacturing a blisk for use in a turbine section of a gas turbine engine, comprising:

forming a plurality of casting negatives from a first material, wherein each of the casting negatives defines one of a plurality of cooling passage within the blisk;

forming a mold of the blisk using a second material having a melting temperature which is less than a melting temperature of the first material, wherein the plurality of casting negatives are enclosed within the mold;

forming a shell around the mold using a third material having a melting temperature which is higher than the melting temperature of the second material;

removing the mold by heating the mold to a temperature above the melting temperature of the second material and below the melting temperatures of the first material and the third material;

filling the shell with a fourth material to form the blisk, wherein the blisk comprises a hub, a rim, and a blade; and removing the plurality of casting negatives from the blisk to define the cooling passages, wherein each cooling passage extends from an inlet in an inner surface of the rim, from the inlet through a channel enclosed within the rim, from the channel through a chamber defined by an interior surface of the blade, and from the chamber through an outlet in a radially outward surface at a leading end of the blade.

14. The method of aspect 13, wherein the first material and the third material are the same material.

15. The method of any of aspects 12 and 13, wherein each of the casting negatives comprise a first printout, and wherein each of the first printouts are coupled to another of the first printouts.

16. The method of any of aspects 13 through 15, wherein each of the casting negatives comprise a second printout, and wherein each of the second printouts are coupled to the shell after the shell has been formed.

17. The method of any of aspects 13 through 16, wherein forming the mold of the blisk comprises forming a mold of the hub and a plurality of separate molds of a combined blade and rim portion.

18. The method of aspect 17, further comprising welding each mold of the combined blade and rim portion to the mold of the hub.

19. The method of aspect 18, further comprising machining the blisk at a plurality of seams where each of the molds of the combined blade and rim portion were welded to the mold of the hub.

20. The method of any of aspects 13 through 19, wherein removing the casting negatives comprises dissolving the first material from the blisk.

What is claimed is:

1. A blisk for use in a turbine section of a gas turbine engine, the blisk comprising:

a hub;

a rim positioned radially outward from the hub, wherein the rim comprises a first leading end, a first trailing end, an outer surface facing radially outward from the hub, and an inner surface; and a blade integral to the rim, the blade comprising a second leading end, a second trailing end, an interior surface defining a chamber within the blade, and a radially inward end, wherein a cooling passage extends from an inlet defined in the inner surface of the rim proximate the first leading end, from the inlet through a channel enclosed within the rim and extending along the outer surface of the rim from proximate the first leading end to proximate the first trailing end where an opening is proximate the first trailing end of the rim and the second trailing end of the blade, the cooling passage extending between the channel and the chamber through the opening, and wherein the channel is separated from the chamber except at the opening.

2. The blisk of claim 1, further comprising a plurality of blades comprising the blade, and a plurality of channels comprising the channel, wherein each blade of the plurality of blades is spaced apart from each other on the outer surface of the rim, and wherein each channel of the plurality of channels extends along a portion of the outer surface of the rim which is arranged between a pair of the plurality of blades.

3. The blisk of claim 1, wherein the channel comprises a first channel further extending along a portion of the outer surface of the rim which is proximate to a pressure side of the blade, the blisk further comprising a second channel extending along a portion of the outer surface of the rim which is proximate to a suction side of the blade.

4. The blisk of claim 3, wherein the blade comprises a first blade, the suction side comprising a first suction side, the portion of the outer surface of the rim comprising a first portion of a first outer surface of a first rim, the cooling passage comprising a first cooling passage, and wherein the first channel is adjacent to a third channel extending along a second portion of a second outer surface of a second rim of a second blade proximate to a second suction side of the second blade.

5. The blisk of claim 1, wherein the blisk is a unitary body formed from a single casting.

6. The blisk of claim 5, wherein the blisk comprises a nickel-based superalloy.

7. A turbine section for use in a gas turbine engine, comprising:

a blisk comprising a hub and a rim positioned radially outward from the hub, wherein the rim comprises a first end, a second end, an outer surface extending from the first end to the second end, and an inner surface, and a blade integral to the rim, the blade comprising a leading end proximate to the first end of the rim, a trailing end proximate to the second end of the rim, an interior surface defining a chamber, a radially inward end, and a radially outward surface opposed to the radially inward end;

wherein a cooling passage extends from an inlet defined by the inner surface at the first end of the rim to a channel enclosed in the rim, the channel extending from the first end to the second end where an opening into the chamber of the blade is proximate to the trailing end of the blade, wherein the channel is separated from the chamber except at the opening, and wherein the cooling passage further extends from the chamber through an outlet in the radially outward surface at the leading end of the blade;

a cooling source configured to supply fluid to the inlet of the cooling passage; and a vent configured to receive fluid from the outlet of the cooling passage.

8. The turbine section of claim 7, wherein the chamber is configured to allow unobstructed flow of fluid from the trailing end to the leading end of the blade.

9. The turbine section of claim 8, wherein the interior surface of the blade comprises a strut extending through the chamber from a pressure side of the blade to a suction side of the blade.

10. The turbine section of claim 8, wherein the interior surface of the blade defines an opening at the leading end of the blade, wherein the opening is configured to allow fluid communication between the chamber and an exterior surface of the blade.

11. The turbine section of claim 7, wherein the interior surface of the blade comprises a first wall extending radially outward from a radially inward end of the interior surface and a second wall extending radially inward from a radially outward end of the interior surface.

12. The turbine section of claim 11, wherein the second wall is positioned closer to the outlet of the cooling passage than the first wall, such that fluid passing through the chamber must make three passes between the radially inward end and the radially outward end of the interior surface between the opening of the chamber and the outlet of the cooling passage.

13. A blisk for use in a turbine section of a gas turbine engine, the blisk comprising:

a hub;

a rim positioned radially outward from the hub, wherein the rim comprises a leading end, a trailing end, an outer surface facing radially outward from the hub, and an inner surface; and a blade extending radially outward from the outer surface of the rim, the blade comprising an interior surface defining a chamber within the blade, wherein a cooling passage extends from an inlet defined in the inner surface of the rim proximate the leading end, from the inlet through a channel enclosed within the rim and extending along the outer surface of the rim from proximate the leading end to proximate the trailing end where an opening into a chamber is located, wherein the channel is separated from the chamber except at the opening, wherein the hub, the rim, the blade, and the interior surface are a unitary body and formed from a single casting.

14. The blisk of claim 13, wherein the interior surface of the blade comprises a strut extending through the chamber from a pressure side of the blade to a suction side of the blade.

15. The blisk of claim 14, wherein the interior surface of the blade comprises a plurality of struts extending through the chamber, the plurality of struts arranged within the chamber to evenly distribute fluid passing through the chamber.

16. The blisk of claim 14, wherein the strut is integrally formed to the interior surface of the blade.

17. The blisk of claim 13, wherein the interior surface of the blade further comprises a bleed hole positioned on a leading edge of the blade and extending between the chamber and an outer surface of the blade.

18. The blisk of claim 13, wherein the cooling passage is divided between a pressure side channel which extends along the outer surface of the rim on a pressure side of the blade and a suction side channel which extends along the outer surface of the rim on a suction side of the blade.

19. The blisk of claim 18, wherein the pressure side channel and the suction side channel are both in fluid communication with the same inlet at a leading end of the blade.

20. The blisk of claim 18, wherein the pressure side channel and the suction side channel are both in fluid communication with the same chamber at the trailing end of the blade.

* * * * *